United States Patent [19]
Miller et al.

[11] Patent Number: 5,327,930
[45] Date of Patent: Jul. 12, 1994

[54] NUCLEAR REACTOR LOCKING PISTON DRIVE SYSTEM AND VALVE ASSEMBLY

[75] Inventors: Joseph S. Miller, Zachary; John J. Lynch, Baton Rouge, both of La.

[73] Assignee: Gulf States Utilities Company

[21] Appl. No.: 972,614

[22] Filed: Nov. 6, 1992

[51] Int. Cl.⁵ .............................................. F16K 43/00
[52] U.S. Cl. ...................... 137/329.3; 376/230
[58] Field of Search .............. 376/235, 234, 232, 230, 376/242; 976/DIG. 127; 137/329.3

[56] References Cited

U.S. PATENT DOCUMENTS

| | | | |
|---|---|---|---|
| 3,347,748 | 10/1967 | Olsson | 376/235 |
| 3,722,545 | 3/1973 | Furlani | 137/625.3 |
| 3,893,469 | 7/1975 | Baker | 137/584 |
| 4,090,917 | 5/1978 | Jabsen | 376/234 |
| 4,227,545 | 10/1980 | Augsburger | 137/340 |
| 4,468,000 | 8/1984 | Smith | 251/84 |
| 4,489,036 | 12/1984 | Jamrus | 376/229 |
| 4,863,673 | 9/1989 | Carruth | 376/230 |
| 4,978,494 | 12/1990 | Rinker | 376/235 |
| 5,085,823 | 2/1992 | Gibo | 376/232 |

Primary Examiner—Donald P. Walsh
Assistant Examiner—Meena Chelliah
Attorney, Agent, or Firm—William C. Norvell, Jr.

[57] ABSTRACT

A locking piston drive system and valve assembly is provided for shutdown of a nuclear reactor. "Chatter" in a check valve assembly which occurs during charging and/or re-charging of control fluid within a control line is eliminated by providing a valve head and a resisting portion defined on the valve head to resist movement of the valve, head when it is urged from sealing engagement on its seat during the charging or re-charging procedure.

6 Claims, 5 Drawing Sheets

NUCLEAR REACTOR LOCKING PISTON DRIVE SYSTEM AND VALVE ASSEMBLY

BACKGROUND OF THE INVENTION (1) Field of the Invention

The invention relates to nuclear reactors, and, particularly, to a system for shutdown of the reactor, including a valve assembly to abate "chattering" during operation.

(2) Brief Description of the Prior Art

A nuclear reactor converts nuclear energy, i.e. atomic energy, into thermal energy. The nuclei of atoms consist, broadly speaking, of the elementary particles called protons and neutrons. The protons have a positive electric charge, whereas neutrons have no charge and are electrically neutral. Very powerful forces of action act between these particles, collectively referred to as "nucleons" and hold them together in the nucleus.

Heavy atomic nuclei are, however, not so stable as light ones, because in the former the repulsive forces exerted by the protons loosen the structure of the nucleus. For this reason it is possible to cause fission of heavy nuclei, such as those of uranium 235, by bombarding them with free neutrons. As a result of this impact, nuclei of uranium 235 are set vibrating, and these vibrations become so violent that the nucleus is split up into several parts, i.e., into a barium and a krypton nucleus. The "fission products" travel at considerable velocity, collide with matter somewhere in the reactor, and give off their kinetic energy as heat. This is a conversion of nuclear energy into heat.

In addition to the fission products and heat formed in the fission of uranium, however, new neutrons are also released, which, in turn, can cause the fission of more uranium atoms. In this way a chain reaction is initiated. The neutron strikes the uranium 235 nucleus and briefly forms the intermediate product, uranium 236, which disintegrates spontaneously into strontium and xenon. Additional neutrons are released in this fission process which sustain the chain reaction.

In order to be able to utilize these neutrons, which are emitted from the parent nucleus at high velocity, for further fissile processes, they have to be slowed down. Low-velocity neutrons are much better suited to split atoms than high-velocity neutrons. The slower neutrons can interact with the uranium nucleus for a greater length of time, whereas faster neutrons are in the vicinity of nucleus for too short a time to initiate the fission process. The velocity of the neutrons is moderated by causing them to collide with light atoms, large numbers of which must be incorporated in a reactor for this purpose. Materials consisting of such lighter items are, for example, graphite and water. The neutrons which have been slowed down in this way will then cause fission of further uranium 235 nuclei. Each fission process gives birth to fresh neutrons, so that the chain reaction is self-sustaining and the reactor is consequently kept in operation.

In the case of a water-moderated reactor, uranium is installed in the form of metallic rods in a vessel filled with water. Fission takes place within the uranium and neutrons which are released in the process and travel into the surrounding water, where they collide with the light hydrogen and oxygen atoms and are moderated, i.e., they lose velocity. These slowed-down neutrons re-enter the uranium rods with a certain probability and there they cause other fission reactions to take place. The fission products formed as a result of these reactions give off their energy to the uranium, which, in turn, transmits it to the water. This hot water is used to turn a turbine which generates electricity.

To ensure that the reactor will not stop functioning nor become excessively overheated, the rate of neutron formation inside it has to be controlled with considerable accuracy. This is done by means of the control rods, which consist of a neutron-absorbing material and which are inserted into the reactor core to an accurately variable depth. This depth of penetration must be just enough to ensure that, on an average, per fission only one neutron remains available to produce another fission reaction. Since the fission products are highly radioactive, the reactor must be enclosed in a thick casing of concrete called the "shield".

A type of water-moderated reactor is sometimes referred to as a boiling water reactor. In these reactors, an emergency system is provided to shut down the reaction in the event of an indication that control of the reaction may be lost or difficult. Typically, such systems incorporate a hydraulic control line having a control fluid therein, such as charging water, or the like, which is pressured by means of an accumulator tank having a piston having one side exposed to a gaseous substance, such as nitrogen. This control line extends to one face of a main drive piston. A charging water header or conduit supplies control fluid into the control line and the accumulator. A check valve assembly is disposed between the charging water header and the accumulator assembly to selectively permit charging and re-charging of the control line and the accumulator.

In the event that it is necessary to shut down the nuclear reactor vessel, a solenoid actuated valve on the control line between the accumulator and the main drive piston is opened to permit fluid, pressured on the order of 1,800 p.s.i.g., to drive the main piston interiorly within the reactor vessel. As the main drive piston is moved, pressure in the control line decreases to approximately 1,100 p.s.i.g. and the check valve assembly downstream of the charging water header immediately opens to recharge the control line and the accumulator.

The flow of fluid in the control line during shutdown is extremely fast and the re-charging of the accumulator is initiated almost spontaneously. It has been found that such recharging results in the ball element of the check valve assembly downstream of the charging water header and upstream of the accumulator to bouncing up and down violently, or "chattering" causing, in turn, large massive hydrodynamic loads to take place on the piping system for the shutdown assembly.

The present invention is directed to abating this problem.

SUMMARY OF THE INVENTION

In the present invention, the valve head element in the above-described check valve assembly is designed to provide a drag on the charging water; or control fluid, to abate chattering. When actuated to provide fluid communication between the charging water header and the accumulator, the valve head element incorporated into the present invention permits pressure equalization of the fluid around the valve head element as the valve head element is lifted off of its seat, and the lifting of the valve head element is continuously sustained.

As drag is increased around this valve head element when it is lifted from its seat, velocity of fluid flow therearound is increased so that the position of the valve head element in the "open" position is stabilized. Additionally, the element forming the valve head in the check valve assembly is also designed such that the sealing engagement between the valve head and the valve seat is not adversely affected during sealing engagement.

Accordingly, a locking piston drive system for selective shutdown of the nuclear reactor vessel is provided. The locking piston drive system includes a reactor housing and a plurality of guide tubes which are disposed interiorly of the housing. A control rod is concentrically housed within each of the guide tubes and have first and second ends with the first of the ends being in communication with a core area in the reactor housing. A plurality of drive piston housings extend through the reactor housing with a drive piston assembly placed within each of the drive piston housings. Each of the drive piston assemblies is operatively secured to a control rod at the second end of the control rod and at one end of the drive piston assembly. A piston head is disposed at another end of the piston assembly. In a preferred form, means for selectively locking each of the drive pistons against movement in the drive piston housing in one direction are provided, having both mechanical and hydraulic actuation elements therein.

An accumulator including a pressurizing element, such as a nitrogen tank, is provided on the control line for selective pressurization of the hydraulic control fluid. Means for introducing the control fluid into the control line means are provided through a charging water header. Check valve means include a housing carried on the hydraulic control line for selective blocking of fluid communication between the control line and the means for introducing the hydraulic control fluid into the control line while control fluid is selectively pressurized by the accumulator means to move each of the control rods into the core.

A fluid flow path is defined through the check valve housing and a plurality of fluid passages selectively communicate with one another through the control fluid flow path. A valve seat is defined on the check valve housing and a valve head is disposed within the check valve housing and is movable between a first position wherein the check valve housing is sealingly secured relative to the check valve seat, and a second position wherein the valve head is disposed away from the check valve seat and a plurality of fluid passages are in fluid communication through the fluid flow path to permit transmission of control fluid into the control line to charge the accumulator means. Resisting means are exteriorly defined on the valve head for resisting movement of the check valve head between the first and second positions, with the valve head further defining at least one fluid flow passageway across the resisting means for continuous fluid communication with each of the fluid passages when the check valve head is in the second position.

DESCRIPTION OF THE PREFERRED EMBODIMENT

Figures 1, 7:
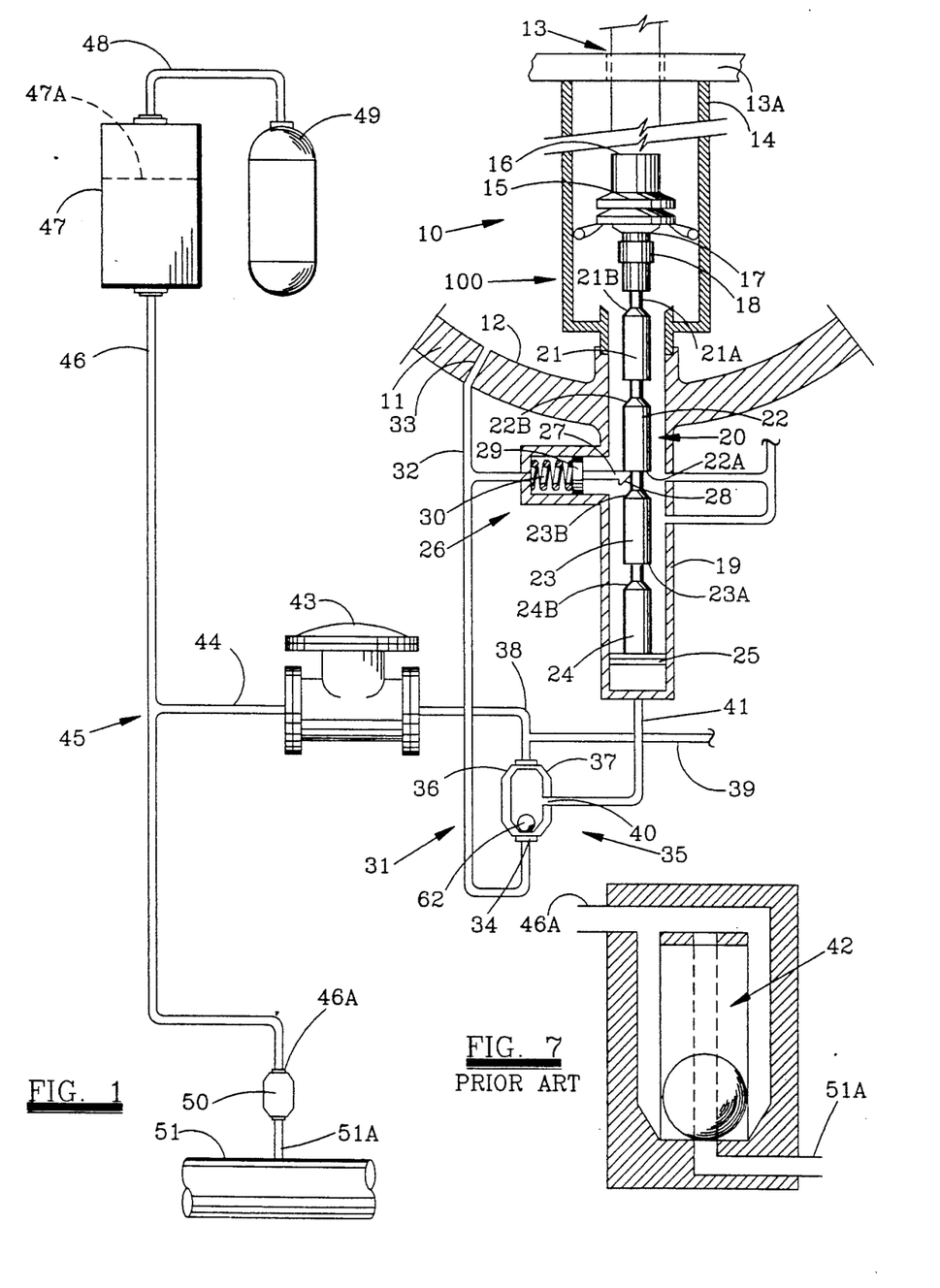
FIG. 1 is a schematic illustration of the locking piston drive system of the present invention.
FIG. 7 is an illustration of a typical prior art valve assembly as it would be utilized in the nuclear reactor locking piston drive system of FIG. 1.

Now, with first reference to FIG. 1, there is shown a locking piston drive system 100 for use in a nuclear reactor 10 including a reactor vessel housing 11 having an interior 12. The core area 13 includes a rod 15 disposed within the interior 12 and inside a guide tube 14 therein.

Figure 2:
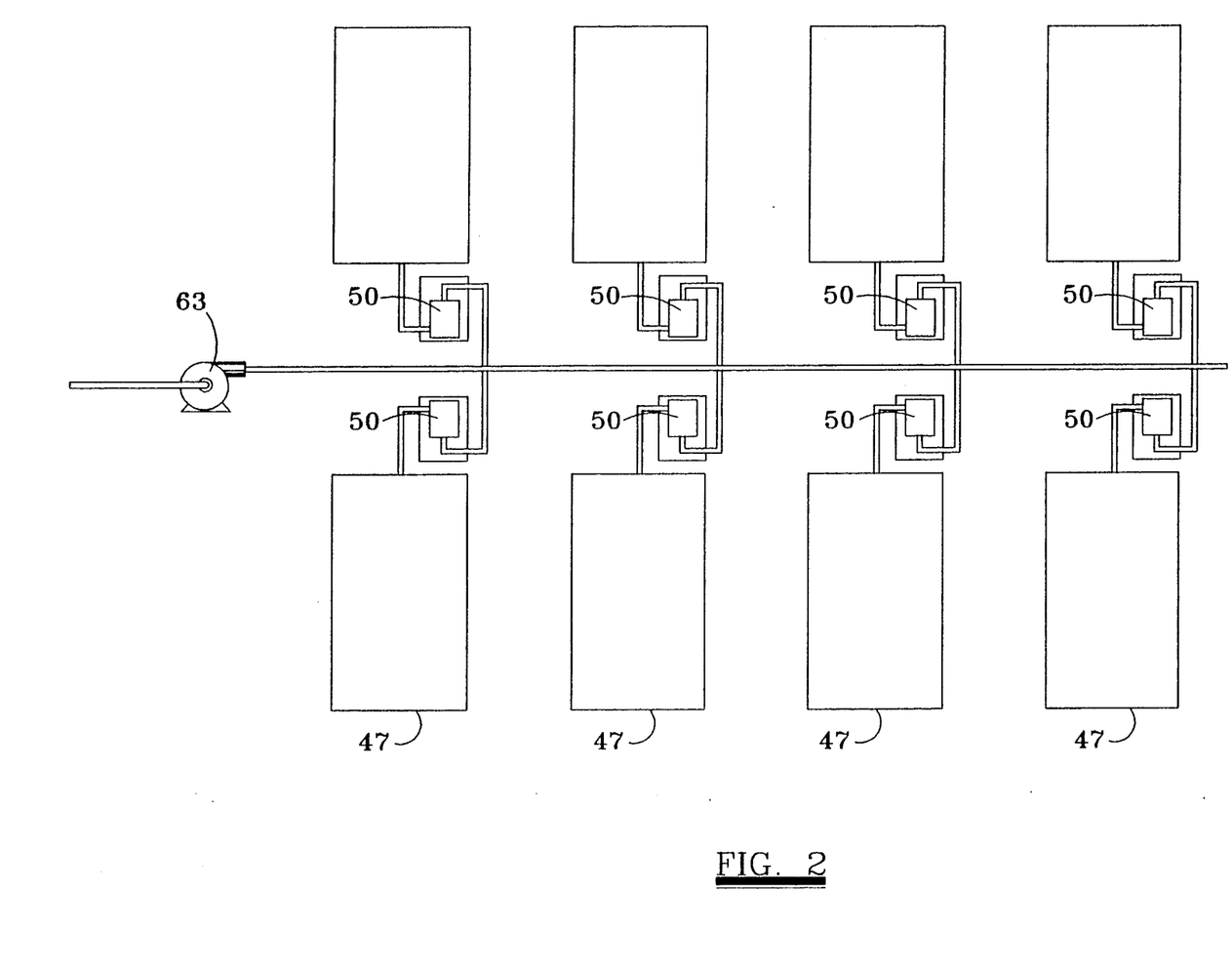
FIG. 2 is a schematic illustration of the locking piston drive assembly of the present invention illustrating plurality usage for a number of drive pistons.

It will, of course, be appreciated that the nuclear reactor 10 of the present invention will have a number of locking piston drive systems 100 therein, one for each control rod, as schematically illustrated in FIG. 2.

The core area 13 sits on a core plate 13A which connects to a series of inwardly extending cylindrical guide tubes 14, each guide tube 14 receiving therein an inwardly extending control rod 15 having a first end 16 facing inwardly within the core area 13. A second end 17 of each control rod 15 is secured at a coupling 18 to a drive piston assembly 20 within a drive piston housing 19 extending through the reactor vessel housing 11 and into the interior 12 thereof.

The drive piston assembly 20 consists of a plurality of piston-like members 21, 22, 23 and 24, each such piston member having an upwardly facing circumferentially extending frontal beveled surface 21B, 22B, 23B and 24B, respectively, for contact with a companionly profiled beveled surface 28 on a collet head 27 laterally projecting within the drive piston housing 19. As the drive piston assembly 20 is moved upwardly through the housing 19 and into the interior 12 of the reactor vessel housing 11, the respective beveled surface, 21B, 22B, 23B, or 24B, will contact and engage the bevel 28 to overcome the lateral bias defined through a spring 30 extending to a ring 29 on the outward end of the collet head 27.

Likewise, each of the piston members 21, 22 and 23 of the drive piston assembly 20 have a lowerly facing circumferentially extending latch surface 21A, 22A and 23A, respectively, which selectively are secured against the uppermost shoulder of the collet head 27 to lock the drive system assembly against movement in a downward direction and out of the interior 12 of the reactor vessel housing 11.

The lowermost piston member 24 does not have such a lowerly facing latch surface, but does have an enlarged piston head 25 at its lowermost end.

The selective locking means 26 of the drive piston assembly 20 includes the spring 30, the collet head 27, and the companion respective shoulders or surfaces of each of the piston members 21, 22, 23 and 24, i.e., the beveled surfaces, such as 21b, and the latch surfaces, such as 21A.

The drive piston assembly 20 is urged upwardly to move the respective control rod 15 through the guide tube 14 by means of hydraulic pressure applied to the piston head 25 to shift the drive piston assembly 20 upwardly. Such hydraulic pressure is applied by means of application of charging water, or control fluid, carried within a header conduit 51 and entering by means of a header line 51A to a check valve 50 (FIG. 1 and FIG. 3C). The check valve 50 extends to a control line 46 by means of an opening 46A to a control fluid accumulator 47. The accumulator 47 contains a sealing plate 47a separating the control fluid from a pressuring fluid, such as nitrogen, introduced through the line 48 to the accumulator 47 for pressurization of the control fluid therein. The line 48 extends to a tank 49 containing an adequate amount of pressuring fluid, such as nitrogen.

The control line 46 extends at lateral "T" 45 to a line member 44 extending to an inlet valve 43, which may be solenoid-activated, which, in turn, extends to a line portion 38 received through an opening 36 in a housing 37 of a check valve means 35. The check valve means 35 contains a spherical valve head element 62 normally sealingly engaging an opening 34 therein and also receiving a line 32 extending into an opening 33 into the interior 12 of the reactor vessel housing 11.

A third opening 40 is disposed within the housing 36 of the check valve means 35 for receipt of a line 41 extending to the lowermost end of the drive piston housing 19, and below the piston head 25.

A line member 39 extends from the line 38 above the check valve means 35 to permit the control rod 15 to be withdrawn.

Thus, the hydraulic control line means 31 includes the control line 46, and members 44, 38 and 41.

Figure 3A:
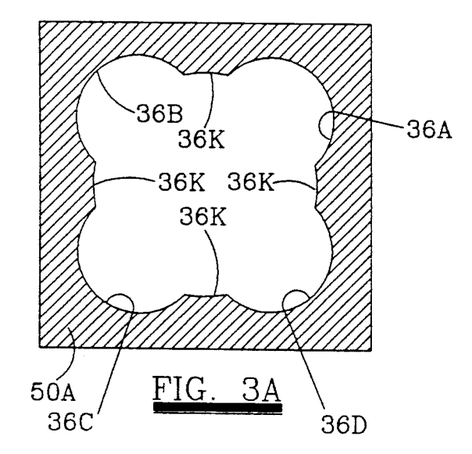
FIG. 3A is a cross-sectional view, looking downwardly, of a housing for the check valve assembly of the present invention.
Figure 3B:
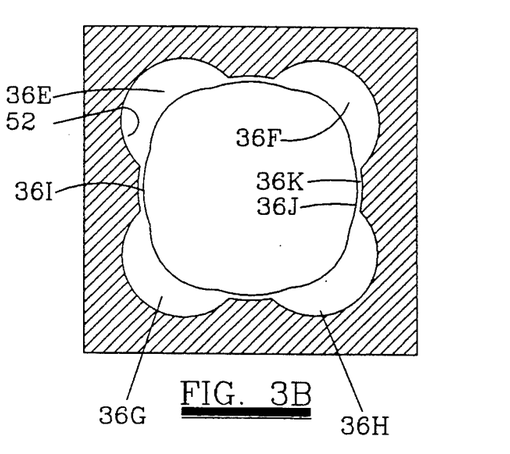
FIG. 3B is a view similar to that of FIG. 3A, illustrating a valve head element disposed interiorly of the housing.
Figure 3C:
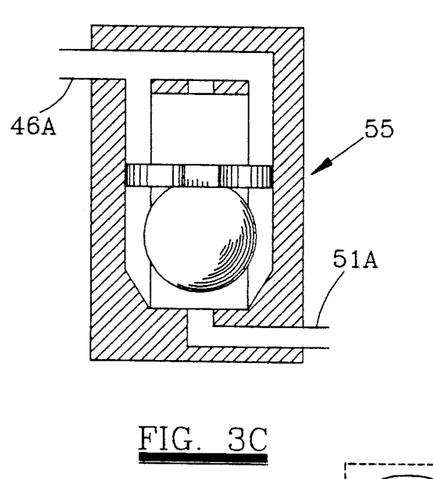
FIG. 3C is a cross-sectional view of the valve assembly shown in FIGS. 3A and 3B.

FIGS. 3A, 3B, 3C, 4A, 4B and 4C illustrate a preferred check valve 50. The check valve 50 has a housing 50a having a hollow interior and contoured semi-circular inner surfaces 36A, 36B, 36C and 36D. Each contoured inner surface 36A, 36B, 36C and 36D have companion slightly arced inner diameter shoulders 36K separating each inner surface (FIG. 3A).

Figure 4A:
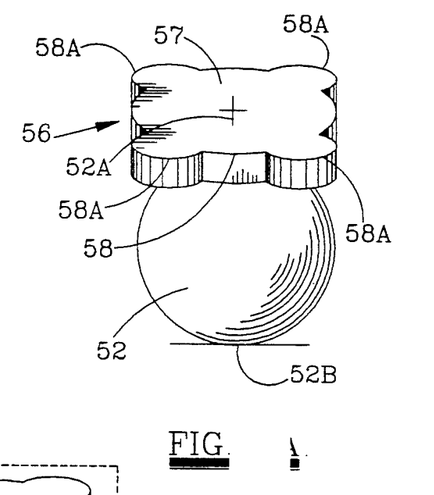
FIG. 4A is a perspective exterior view of a spherical valve head of the present invention.
Figure 4B:
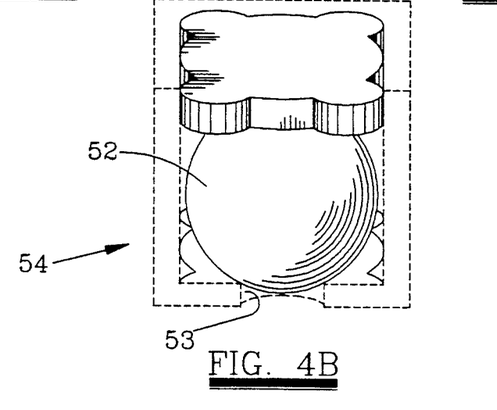
FIG. 4B is a view of the spherical valve head of FIG. 4A disposed within its housing.
Figure 4C:
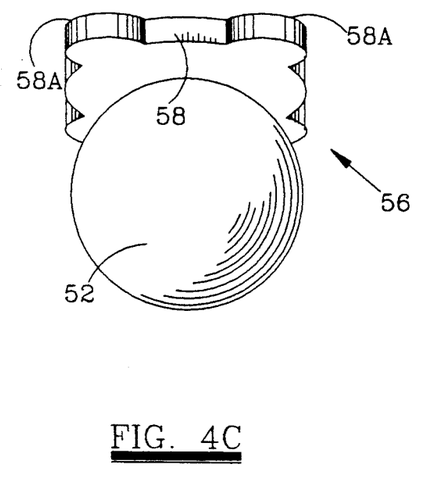
FIG. 4C is a view of the spherical valve head shown in FIG. 4A taken from a lower point looking upwardly toward the valve head plate portion.

As shown in FIGS. 3B and 4A, a spherical valve head 52 has secured thereon at a center point 52A disposed 180° at the point of sealing contact 52B between the valve head 52 and its valve seat 53 (FIG. 4B). A flat plate member 57 is secured to the spherical element 52 in any one of known means, such as spot welding, extrusion, or use of a resin securement. As shown in FIGS. 3B, 3C, 4A and 4B, the resisting means 56 consists of the flat plate 57 on the spherical element or ball 52. The flat plate 57 has an outer diameter portion 58 which extends toward, but does not contact, the respective inner diameter arched surface 36K on the housing 50A, the area between the outer diameter 58 of the flat plate 57 and the arched surfaces 36K providing a fluid flow area. Likewise, a series of semi-circular extensions 58A are provided around the flat plate 57 and are received through the respective contoured inner surfaces 36A, 36B, 36C and 36D. Again, the outer smooth edge or surface of the respective semi-circular elements 58A do not contact the companion inner surfaces 36A, 36B, 36C or 36D, thus providing additional fluid flow areas therebetween.

As shown in FIG. 4B, the valve-head 52 is shown in a first position 54 sealingly engaged upon a valve seat 53. The valve head 52 is shown disengaged from a sealing engagement on the valve seat 53 and placed in unsealing position, as shown in FIG. 3C, during recharging of the accumulator 47, as discussed below.

When in the position shown as in FIG. 3C, the valve assembly provides a flow path 42 (FIG. 7) through the housing of the check valve 50 so that control fluid entering the control valve 50 through the line 51a from the charging water header 51 may be transmitted through the control line 46 to the accumulator 47.

As shown in FIG. 2, a plurality of accumulators 47 through respective lines communicate with check valve assemblies 50 and are activated by means of charging pump 63.

Figure 5A:
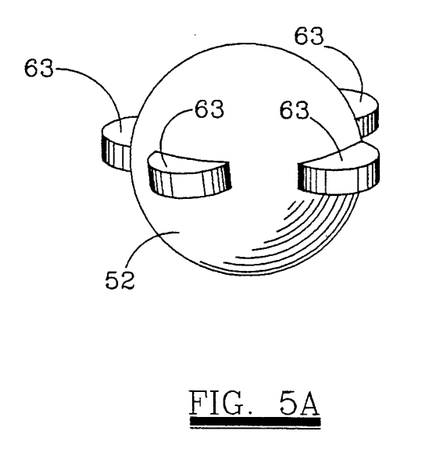
FIGS. 5A and 5B are perspective views of an alternate configuration Of a spherical valve head of the present invention.
Figure 5B:
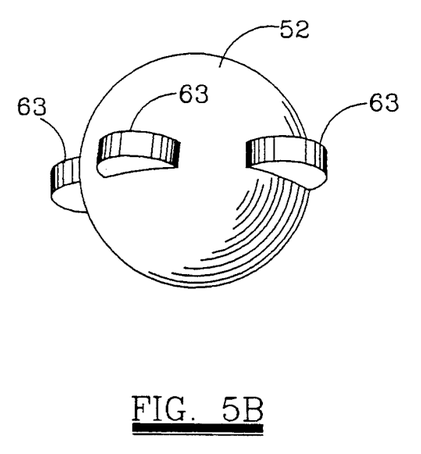
Figure 6:
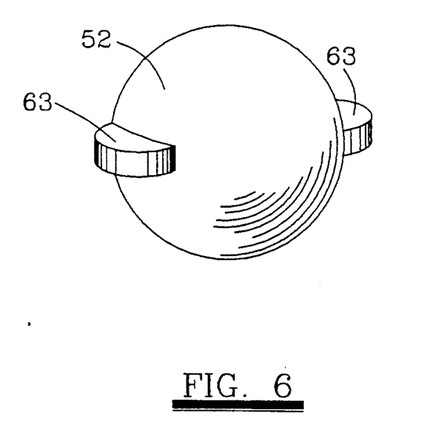
FIG. 6 is a perspective view of yet another alternate embodiment of a spherical valve head for incorporation into the present invention.

As shown in FIGS. 5A and 5B, an alternate form of the spherical valve element 52 would include a series of semi-circular element 63 disposed along a line at the approximate center of a sphere 52. As shown, the semi-circular elements 63 are disposed around the spherical element 52, such that four such elements 63 are provided. Alternatively, as shown in FIG. 6, a pair of such semi-circular elements 63 may be provided and disposed 180° from one another around the exterior on the center line of the sphere 52.

The resisting means 56 of the present invention can be designed to accommodate any desired rate or type of fluid and flow and the geometry of such resisting means will, of course, depend upon the type of valve head element selected, i.e., ball, conical element, plug, or the like, as well as the configuration of the housing for the valve head element. Accordingly, the following calculation may be utilized to provide a satisfactory resisting means and valve head and seat element for incorporation into the present invention: A valve head in the form of a plug is proposed for which the gap between the valve head and the valve housing is defined by $$g = \left( \frac{12\mu \, Q \text{ height}}{\Delta P \text{ perimeter}} \right)^{\frac{1}{3}}$$

g = gap distance
$\mu$ = viscosity of fluid
height = height of straight sides of plus (exclusive of top element)
Q = flow
$\Delta P$ = pressure drop; must be larger than the weight of the moving valve head divided by the projected area perimeter = internal perimeter of the valve housing This equation is applicable to a fluid with a Reynold's number defined for flow past the moving valve head in the laminar range:

$$Re = \frac{Pvg}{\mu} = \left(\frac{PQ}{\mu \text{ perimeter}}\right) < 2000$$

V = velocity of fluid
P = fluid density

Figure 8:
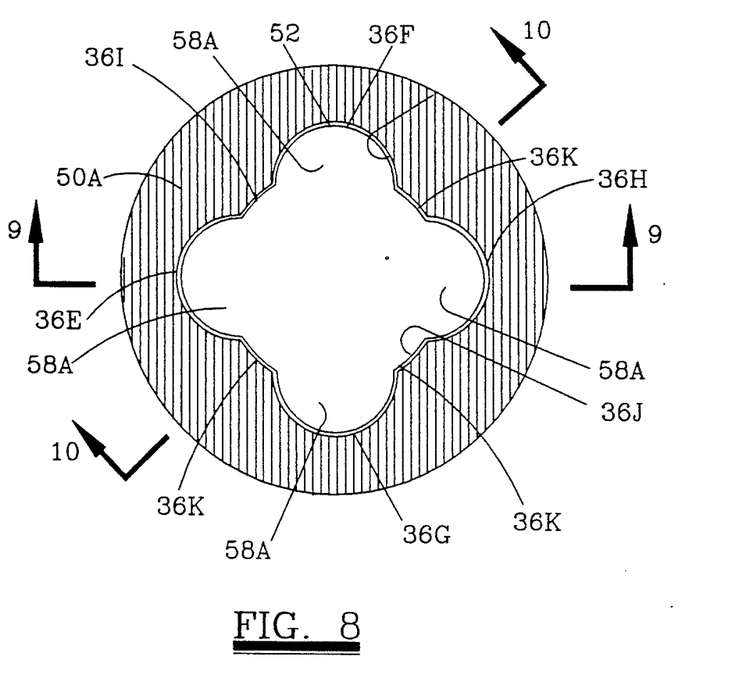
FIG. 8 is a cross-sectional view, looking downwardly, of an alternative preferred embodiment of the valve assembly incorporated into the present invention.
Figure 9:
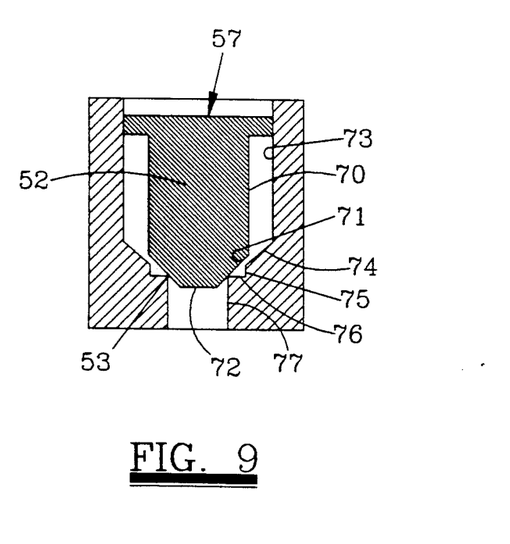
FIG. 9 is a cross-sectional view taken along lines 9—9 of FIG. 8.
Figure 10:
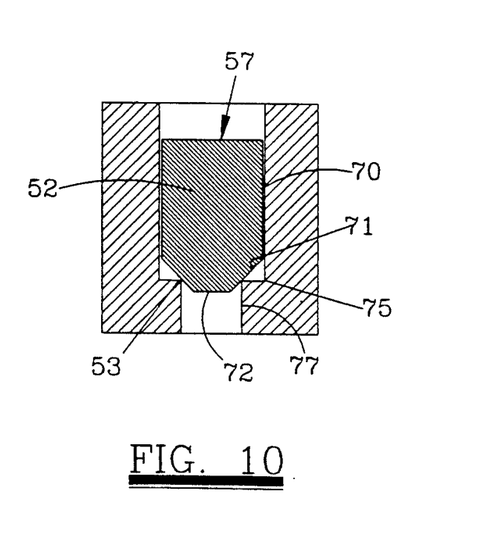
FIG. 10 is a cross-sectional view taken along lines 10—10 of FIG. 8.

Now referring to FIGS. 8, 9 and 10 the valve assembly incorporated into the present invention is shown with the valve head in the form of a plug, with like numerals being used for like parts as in FIGS. 3a, 3b, 3c, 4a and 4b. As shown in FIG. 9, the valve head 52 is in the form of a plug having an expanded diameter top 57, the complete configuration of which is shown in FIG. 8. The plug 52 has an elongated outer diameter 70 extending to an inwardly lower beveled shoulder 71 which contacts a companion inwardly extending shoulder member 76 on the housing 50a to provide a point of sealing engagement 53 between the plug 52 and its companion housing 50a. Likewise, the housing 50a has an elongated inner diameter wall 73 extending to an abbreviated inwardly extending lowerly sloping shoulder 74 terminating in a vertical plane 75 which, in turn, extends to a horizontal shoulder 76 having a point 53 for sealing engagement with the plug 52 when the plug 52 is in the position as shown in FIG. 9. The shoulder 76 extends to and terminates at a vertical inner diameter wall 77 defining the fluid flow passageway below a terminating end 72 of the plug 52.

It will be appreciated that pressure within the interior 12 of the reactor vessel 11 can be transmitted through the opening 33 into the line 32 through the check valve means 35 and into the line 41 to apply pressure across the lower face of the piston head 25, in the event that pressure within the hydraulic control line means 8 drops below a normal amount, thus providing a back-up activation of the locking piston drive system 100.

OPERATION

Prior to activation of the locking piston drive system 100, the piston assembly 20 and the respective control rods 15 will be positioned within the nuclear reactor 10, as shown in FIG. 1.

In the event of an immediate shutdown of the nuclear reactor 10, is transmitted to the inlet valve 43 and the valve 43 opens to communicate the lines 44 and 38. When this occurs, the spherical valve head element 62 is moved to its seat to block the opening 34 and control fluid will enter the lines 38 and 41 to the piston head 25. As fluid passes from the accumulator 47 into the control lines 46, 44, 38 and 41 to the piston head 25, the increased pressure therebelow and within the housing 19 will drive the piston head 25 upwardly to shift the piston members 21, 22, 23 and 24 upwardly in the guide 14 to move the control rods 15 into a safety position within the reactor 10.

As the piston head 25 moves upwardly, pressure within the accumulator 47 as well as in the control lines 46, 44, 38 and 41 will rapidly decrease from about 1,800 p.s.i.g. to about 1,100 p.s.i.g. Accordingly, pressure within the charging water header 51, which now exceeds that within the control lines and the accumulator 47, will urge the valve head 52 from sealing engagement on the valve seat 53, to move same from the position as shown in FIG. 4B, to the position as shown in FIG. 3C. Now, a flow path 42 will be established within the check valve 50 to permit re-charging of the accumulator through transmission of charging water or control fluid through the control line 46 to the accumulator 47. Fluid will pass around the exterior of the valve head 52 and within the fluid flow areas 36E, 36F, 36G, 36H, 36I and 36J. However, because the spherical element 52 includes the plate member 57, fluid flow dynamics will be altered and there will be resistance to fluid flow across the element 52 from below the element 52 to the top of the plate 57, thereby "dampening" the movement of the valve 52. As opposed to quickly moving up and down in the housing, the spherical element 52 and the plate 57 will be effectively suspended in a central position in the housing, thereby avoiding the "chattering" effect in prior art components. Once the accumulator 47 is adequately repressured, the valve head 52 will fall and again become sealingly engaged upon the valve seat 53.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a check valve assembly including a housing, a fluid flow path through said housing, a plurality of fluid passages selectively communicating with another through said fluid flow path, and a valve seat defined on said housing, the improvement comprising: a spherical valve head disposed within said housing and moveable between a first position wherein said valve head is sealingly secured relative to said valve seat, and a second position wherein said valve is disposed away from said valve seat and a plurality of said fluid passages are in fluid communication through said fluid flow path, said spherical valve head including resisting means exteriorly defined thereon for resisting movement of said valve head between said first and second positions, said spherical valve head further defining at least one fluid flow path adjacent and resisting means and in selective fluid communication with each of said fluid passages, said spherical valve head further including extensions projecting outwardly away from the spherical valve head toward the valve housing.

2. The improvement of claim 1: said housing having a first continuous inner diameter, and wherein the spherical valve head is a circular ball element, and the resisting means includes a flat plate securingly carried by said ball element and having a center point disposed 180 degrees from a center line at the point of sealing contact between said valve head and said valve seat, said flat plat having a plurality of outer diameters, each outer diameter being less than the inner diameter of said housing.

3. The improvement of claim 1 wherein the spherical valve head is a ball element and the resisting means includes a plurality of protrusions carried by and extending outwardly of said ball element.

4. The improvement of claim 3: said plurality of protrusions being carried by said ball element along a line through said ball element having a plane horizontally disposed to a line defined at the intersection of said valve head and said valve seat at the point of sealing therebetween.

5. The improvement of claim 1 wherein the spherical valve head is a ball element and the resisting means includes a series of defined protrusions carried by and extending outwardly of said ball element.

6. In a check valve assembly including a housing, a fluid flow path through said housing, a plurality of fluid passages selectively communicating with another through said fluid flow path, and a valve seat defined on said housing, the improvement comprising: a spherical valve head disposed within said housing and moveable between a first position wherein said valve head is sealingly secured relative to said valve seat, and a second position wherein said valve head is disposed away from said valve seat and a plurality of said fluid passages are in fluid communication through said fluid flow path, said spherical valve head including resisting means exteriorly defined thereon for resisting movement of said valve head between said first and second positions, said spherical valve head further defining at least one fluid flow path adjacent said resisting means and in selective fluid communication with each of said fluid passages, said valve head being suspendable within said valve housing only by flow of fluid through the check valve housing when the valve head is in said second position.

* * * * *